June 7, 1949. W. V. BROWN 2,472,693
PITCH INDICATOR FOR VARIABLE PITCH PROPELLERS
Filed June 25, 1946 2 Sheets-Sheet 1

INVENTOR.
William V. Brown.
BY
ATTORNEY.

June 7, 1949. W. V. BROWN 2,472,693
PITCH INDICATOR FOR VARIABLE PITCH PROPELLERS
Filed June 25, 1946 2 Sheets-Sheet 2
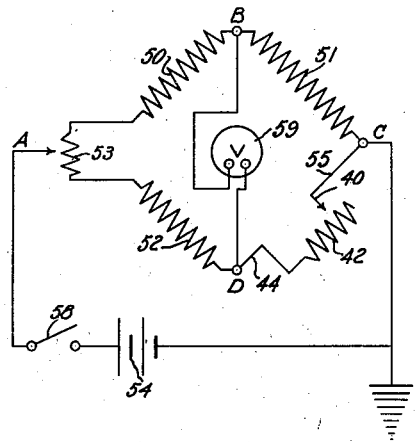
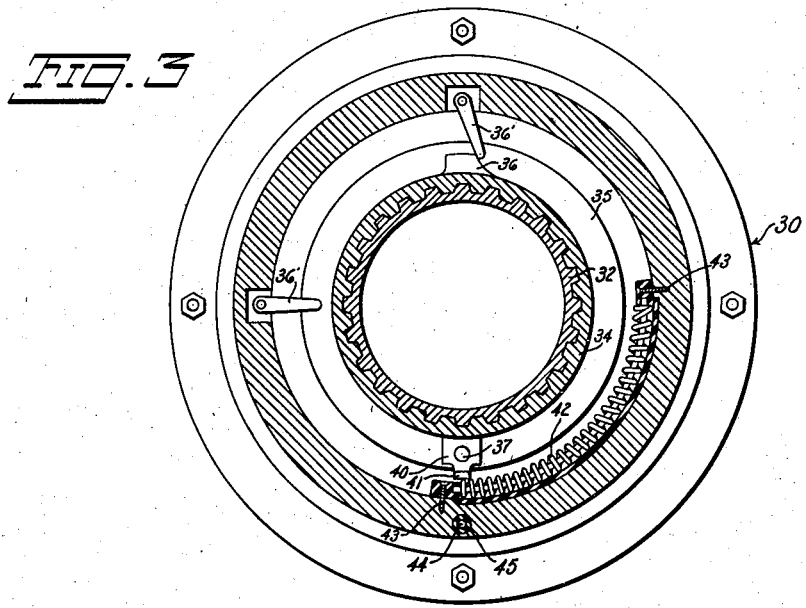
INVENTOR.
William V. Brown.
BY Charles S. Wilson
ATTORNEY.

Patented June 7, 1949

2,472,693

UNITED STATES PATENT OFFICE 2,472,693

PITCH INDICATOR FOR VARIABLE PITCH PROPELLERS

William V. Brown, Flushing, N. Y., assignor to Republic Aviation Corporation, near Farmingdale, N. Y., a corporation of Delaware Application June 25, 1946, Serial No. 679,281

3 Claims. (Cl. 177—351)

This invention relates to indicators for denoting the pitch, and changes of pitch, of variable pitch propellers and is designed to constitute either a permanently installed instrument or a testing instrument temporarily installed in association with the propeller. To that end, in the illustrative adaptation herein shown and described, a variable controlling element is so associated with the blades of the propeller, or with the mechanism by which the pitch thereof is altered, that it varies in agreement with and response to changes of propeller pitch and this controlling element is coupled with an indicator or recorder to measure and indicate the direction and amplitude of all pitch changes.

The instant invention contemplates an instrument for recording a continuous indication of the blade angle and in so doing employs a minimum of moving parts and insures constant and invariable accuracy.

Another purpose of this invention is an instrument of this general type which requires minimum alternation of the propeller assemblies for installation and involves the addition of very little weight.

With the above and other objects in view, as will be apparent, this invention consists in the construction, combination and arrangement of parts all as hereinafter more fully described, claimed and illustrated in the accompanying drawings wherein:

Fig. 2 is a diagram of an electronic circuit designed to include said resistor and measure and record the variations thereof in accordance with the present invention;

Fig. 3 is a transverse section taken along the line 3—3 of Fig. 1 showing the variable resistor and its cooperation with the mechanism by which the pitch of each of several propeller blades is changed in unison; and Fig. 4 is a front view of a form of indicating meter or recorder calibrated to read directly in pitch angle and direction of pitch.

Figure 1:
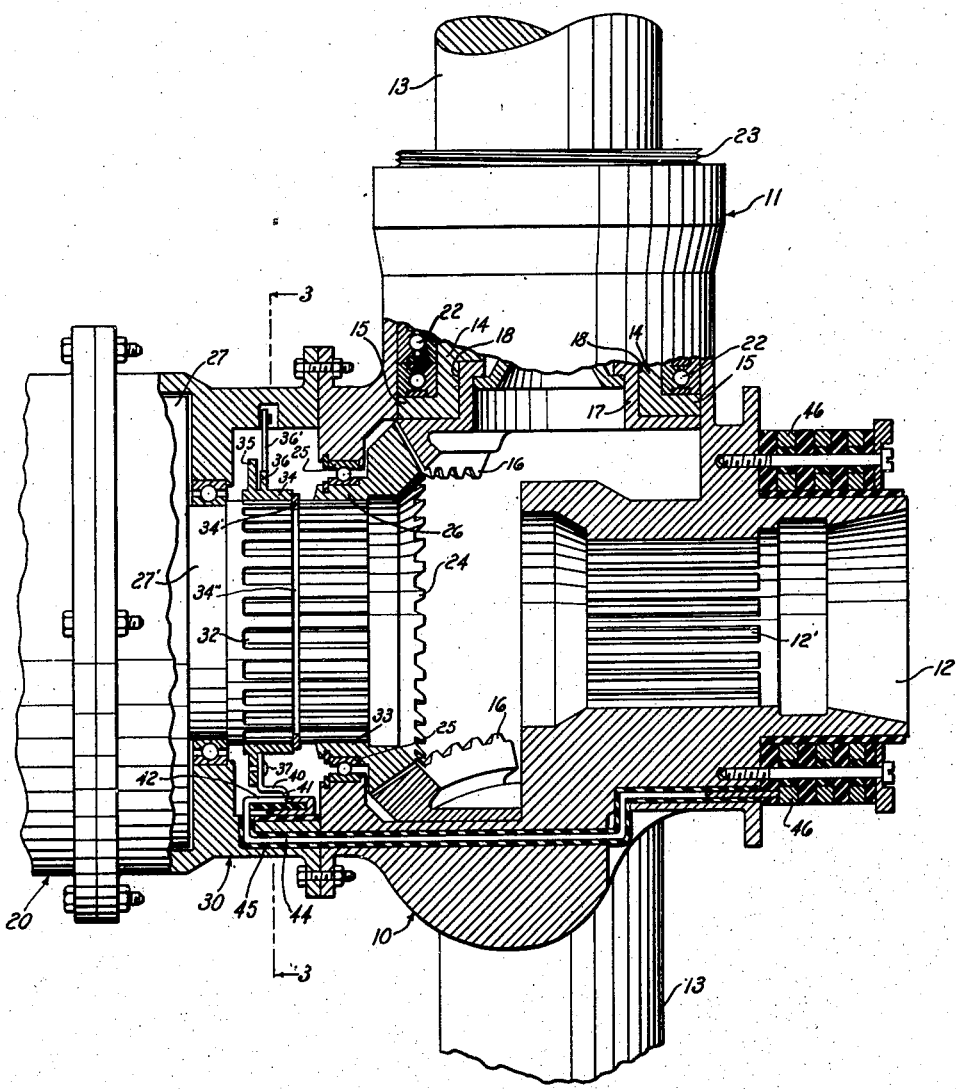
Fig. 1 is a longitudinal section partly in elevation of an adjustable pitch propeller and illustrates one method of positioning a controlling element, such as a variable resistor, within the assembly to respond to variations and changes in pitch of the propeller blades.

Referring to the drawings 10 designates the propeller hub having two or more radial sockets 11 for rotatably receiving and mounting the root ends 14 of the propeller blades 13, and a passage 12 for the reception of the connection, such as the cones and splines 12' for securing the propeller hub 10 to the drive shaft projecting from an engine. The propeller blades 13 are each provided with a hollow cylindrical root section 14 having an exterior flange 15 against or to which is secured a fragmentary driven bevel gear 16 supported and centered by an upward cylindrical extension 17 received and rigidly secured in an internal recess 18 in the wall of the blade root 14.

Each propeller blade 13 is rotatably mounted in its socket 11 of the hub 10 by a series of concentric thrust bearings 22 positioned in a channel defined by the wall of the socket and the surface of the cylindrical blade root 14. The bearings 22 seat against the flange 15 of the blade and are there held in position by an externally threaded locking collar 23 seated in the upper end of the socket 11.

Also positioned within housing 10 is a master or driving ring gear 24 adapted to mesh with each and every of the several fragmentary bevel gears 16 aforesaid so that the rotation of the master gear in either direction is imparted equally to all of the gears 16. A suitable concentric antifriction bearing 25, positioned between an outwardly extending flange 26 on the master gear 24 and the housing 10, supports the said master gear.

In opposition to the passage 12 of the hub 10, and illustrated in elevation, is a housing 20 containing any suitable power source and power transmitting means. This power assembly rotates a shouldered cylindrical member 27 mounted in an intermediate housing 30 in alignment with the flange 26 of the master gear 24. The smaller section or shoulder 27' of the cylindrical member 27 is provided with the splines 32 for engagement with corresponding internal splines 33 within the flange 26 of the master gear 24.

Keyed or splined to and rotatable with the cylindrical member 27 is a collar 34 having an outstanding flange 35 and a relatively short cam 36 spaced from and parallel to said flange. The collar 34 is locked in position on the member 27 by a split ring 34' seated in a groove 34'' formed in the member 27. The cam 36 is adapted to cooperate with and move suitable limit switches 36', to thereby limit the degree of rotation of the driving member 27 which in turn limits the degree and direction of pitch of the blades 13.

The construction of the hub 10, its connection 12—12' with the drive shaft of the engine, the specific mounting of the blades 13 and the roots 14 thereof, and the particular mechanism hereinbefore described for varying and changing the pitch of the blades 13 in either direction as such, form no part of the present invention beyond illustrating one of the many forms of variable pitch propellers especially designed for use in aircraft with which the instant invention may be associated to indicate the degree and direction of change in the pitch of the blades 13. In short all of the mechanism described herein to this point is merely environmental and illustrative and is not to be considered as a limitation of the scope, use and adaptability of this invention.

For combining and associating the present instrument with the particular propeller assembly hereinbefore described an electrical contacting arm 40 of spring bronze or similar material is secured to the flange 35 of the collar 34 by any means such as the screw 37. The shoe 41 of the arm 40 is adapted to ride on a wire wound resistor 42 mounted within the housing 30 of the hub and insulated from all metallic parts thereof with the exception of those portions underlying or in the path of the shoe 41 which are bare or exposed. This resistor 42 is rigidly secured to the housing 30 by any suitable means, such as the screws 43.

Since only a change in resistance in proportion to the degree and direction of movement of the master gear 24, or of the blades 13, is required the resistor 42 is included in one side of an electrical circuit while the contact arm 40 is included in other side of the same circuit. For that purpose the lead 44 is connected to and extends from the resistor 42 to a slip ring 46 and as it passes through passages in the hub 10 and intermediate housing 30 it is encased in insulation 45. By a standard brush (not shown) coacting with the ring 46 the connection between the lead 44 and the indicating and recording assembly is completed. The other side of the circuit including the arm 40 is completed through the metallic parts of the hub 10 and intermediate housing 30.

From the foregoing, it is apparent that any rotation of the propeller blades 13 resulting from an adjustment of the power means and power transmitting means contained within the housing 20 will produce a corresponding change in resistance because this movement will displace the contact shoe 41 relative to the resistor 42 an amount equal to the rotation of the cylindrical member 27 or to the rotation of the blades 13 in unison.

Fig. 2, being a schematic diagram of a circuit in accordance with the instant invention, discloses the use of what is commonly termed a Wheatstone bridge for measuring and recording variations in the resistor 42 resulting from changes or alterations in the pitch of the blades 13 as aforesaid. Here the resistor 42 is incorporated in one leg of the bridge and the adjustable resistor or potentiometer 53 is connected to one side of the power source 54 and between the legs 50 and 52 of the bridge. The resistors 50 and 52 are provided for the purpose of balancing the circuit by transferring resistance from one section or leg of the bridge to another, since the total resistances between the points A—B, B—C, C—D, and D—A determine balance or unbalance of the bridge. A source 54 of electrical power in series with an "on off" switch 58, is connected to the diagonally opposite points A and C, and a voltmeter 59 is connected to the conjugate output terminals B and D. The resistor 42 and its sliding and adjustable contactor 40—41 as above pointed out are physically located within the propeller hub and housing and are mechanically associated with the pitch operating mechanism to the end that a change in blade pitch produces a change in the effective value of resistor 42. The lead 44 represents one electrical connection from the resistor, through the slip ring 46 assembly to the point D of the bridge, and the wire 55 comprises the connection to ground whereby the contact arm 40 is connected to point C of the bridge.

Therefore, it is apparent, that with the propeller blades in a given normal position, and the several resistors adjusted so that the relationship of leg A—B to leg B—C is equal to the relationship of leg A—D to leg D—C, the voltmeter 59 will read zero voltage and the bridge will be balanced. Any deviation of resistor 42 from its normal value will disturb the mathematical relationship between the legs of the bridge and produce a deflection or voltage reading on the meter on one side or the other of zero. Since the voltage reading is always proportional to any change in resistor 42 and since any change in the resistor 42 is proportional to a change in propeller pitch the change in voltage would also be proportional to any change in propeller blade pitch and it therefore follows that the voltmeter 59 can be calibrated in pitch to provide the pilot with direct indications or recordings of variations in pitch angle.

In Fig. 5 is shown in elevation the meter 59 wherein a center zero denotes the neutral position of the blades 13 and the clockwise or counterclockwise blade rotation on opposed sides of neutral by the needle 55. The scale 56 is calibrated in degrees so that a direct reading is obtained by the displacement of the meter needle 55 from zero in either direction. The mechanical adjustment of the needle to the zero position before voltage is actually supplied to the bridge circuit by closing of switch 58 (Fig. 2) may be accomplished by the knob 57 associated in the usual manner with the meter 59.

The instrument or indicator herein described manifestly may constitute permanent equipment for use in conjunction with any variable pitch propeller in which event the meter 59 may be a part of the instrument panel, or it may be temporarily associated with the propeller for test purposes only and in that case the meter can be located at any convenient point, usually with other test instruments or gages.

What is claimed is:

1. A device for indicating the pitch of a variable pitch propeller consisting of a hub, a series of propeller blades each mounted for limited rotary movement in said hub, a driven gear fixed to the inner end of each propeller blade and a master driving gear meshing with all of said driven gears, comprising a variable resistor concentric to the axis of the master gear and fixedly secured to the interior of the hub, a contactor associated with the master gear for movement in unison therewith and cooperating with the aforesaid resistor to vary the effective value thereof, a normally balanced bridge having four electrically related resistors including the aforesaid variable resistor, and means associated with the bridge to indicate the degree of unbalanced conditions in said bridge resulting from variations in value of the variable resistor.

2. The combination with a variable pitch propeller consisting of a hub, a series of propeller blades each mounted for limited, rotary movement in said hub, a driven gear fixed to the inner end of each blade and a master driving gear within the hub meshing with all of said driven gears, of a resistor concentric to the axis of the master gear and fixedly mounted on the interior of the hub, a contactor associated with the master gear for movement in unison therewith and cooperating with the aforesaid resistor to vary the effective value thereof, a bridge consisting of four electrically related elements including said resistor as one of said elements, a pair of input terminals, a conjugate pair of output terminals, and means associated with the output terminals to indicate variations in value of said resistor due to movement of said master driving gear and its associated contactor.

3. The combination with a variable pitch propeller comprising a hub, a master driving gear mounted in said hub, a series of propeller blades mounted for limited rotary movement in said hub, and a driven gear at the inner end of each propeller blade, meshing with said master driving gear, of a normally balanced bridge consisting of four electrically related resistors, one of said resistors being a variable resistor mounted in said hub concentric to the axis of said master driving gear, a contact fixed to said master driving gear in cooperation with said variable resistor, whereby the rotary adjustment of the master driving gear varies the effective value of the variable resistor to unbalance the aforesaid bridge in proportion to the adjustment of the master driving gear, and means associated with said bridge for indicating the degree of unbalance thereof resulting from the rotary adjustment of the master driving gear.

WILLIAM V. BROWN.

REFERENCES CITED

The following references are of record in the file of this patent:

UNITED STATES PATENTS

| Number | Name | Date |
|---|---|---|
| 687,948 | Wood | Dec. 3, 1901 |
| 1,593,626 | Foote | July 27, 1926 |
| 1,860,827 | Turnbull | May 31, 1932 |
| 2,337,613 | Martin | Dec. 28, 1943 |